United States Patent [19]

Sokol

[11] 4,321,660

[45] * Mar. 23, 1982

[54] UNIVERSAL TROUBLE LIGHT

[75] Inventor: Louis Sokol, Rockville Centre, N.Y.

[73] Assignee: Plymouth Products Incorporated, Oceanside, N.Y.

[ * ] Notice: The portion of the term of this patent subsequent to Mar. 24, 1998, has been disclaimed.

[21] Appl. No.: 196,249

[22] Filed: Oct. 14, 1980

[51] Int. Cl.[3] .............................................. B60Q 1/00

[52] U.S. Cl. .................................. 362/368; 362/378; 362/396; 362/398; 362/421; 362/427

[58] Field of Search ............... 362/109, 186, 376, 378, 362/421, 427, 344, 353, 368, 396, 398

[56] References Cited

U.S. PATENT DOCUMENTS 3,278,203 10/1966 Snyder ................................ 362/421

4,258,414 3/1981 Sokol .................................. 362/421

*Primary Examiner*—Donald P. Walsh

*Attorney, Agent, or Firm*—Lawrence Rosen

[57] ABSTRACT

A universal trouble light includes a longitudinally extending handle and a first apertured ball and a socket therefor carried at one end of the handle. A longitudinally extending bulb carrying section also carries a ball and socket therefor at one of its ends. The balls are rigidly connected by a tube to thereby position the handle and barrel member in spaced proximity to each other. The handle and barrel member are capable of relative rotative and angular movement. A bulb socket is positioned within the bulb carrying section and an electrical conductor connects the socket with a source in the handle, the conductor extending through the balls. The rotation of each ball is limited to a single plane and for a limited arc within that plane.

10 Claims, 6 Drawing Figures

FIG. 2
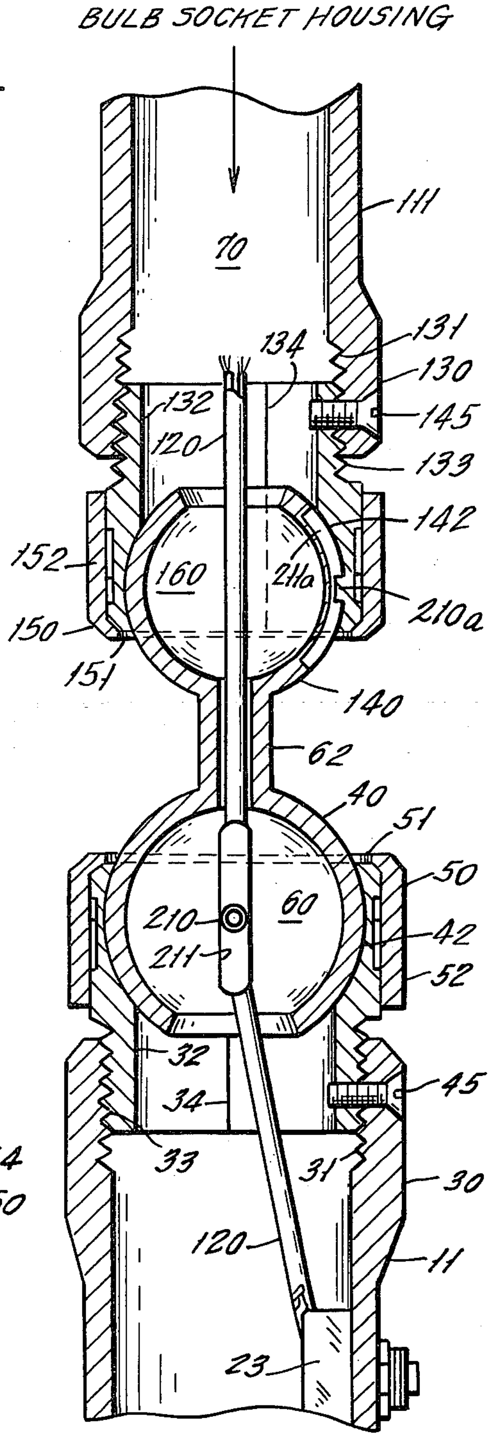
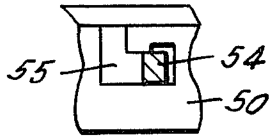
FIG. 3

FIG-4
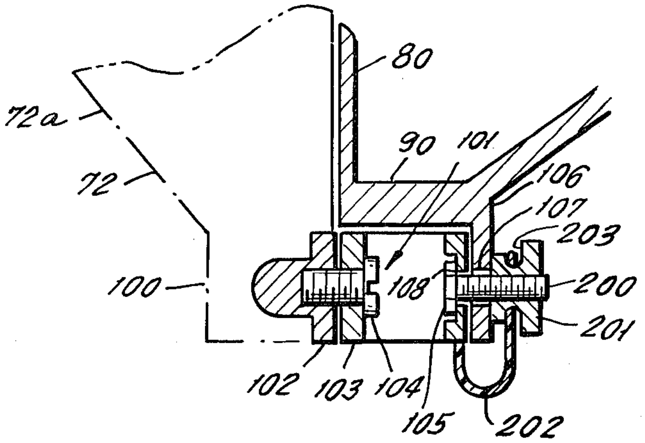
FIG-5
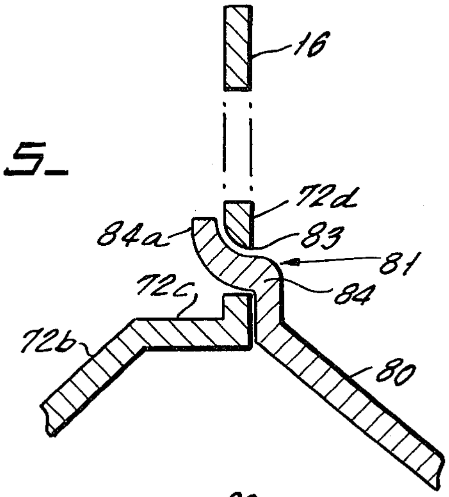
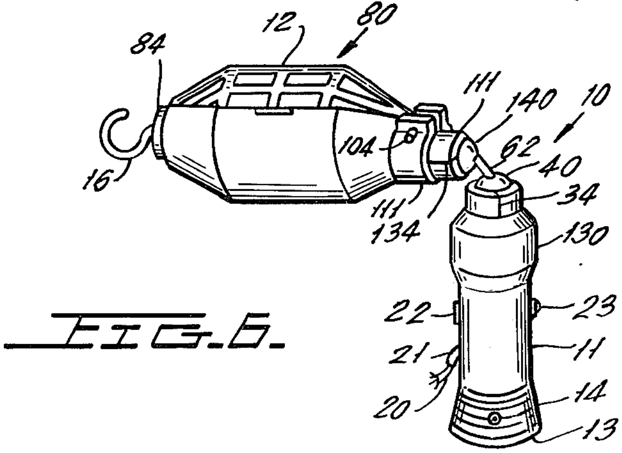
FIG-6

UNIVERSAL TROUBLE LIGHT

BACKGROUND OF THE INVENTION

The present invention is an improvement of the disclosure of application Ser. No. 62,583, filed Aug. 1, 1979, now U.S. Pat. No. 4,258,414.

This invention relates to universal trouble lights and more particularly to a trouble light of the type in which a light source is mounted by means of multiple ball joints to provide for orientation of the illumination.

Trouble lights or lamps have been known heretofore in which the electrical receptacle and bulb are mounted for rotative and angular movement by means of one or more ball joints. However, in order to avoid twisting of the electrical cord and consequent damage thereto special construction of the ball or bulb socket or both were required. Where a pedestal and light bulb mount were utilized as separate members with a ball joint at the end of each member and a connector between through which the electrical conductor for the light bulb could be passed where utilized, there was the possibility that the conductor could be twisted by rotation on its longitudinal axis with respect to its point of securement in either the bottom of the bulb mount or in the base member unless special pains were taken to avoid such a result.

It has also been customary to employ one or more compression springs to maintain a biasing force on the ball members to ensure operative relation between the balls and sockets. In addition, due to the attachment of the electrical conductor leads inside the base and the bulb mount, excessive movement of either housing with respect to the other tended to weaken the lead connections resulting ultimately in a breaking of the electrical circuit and failure of the device.

SUMMARY OF THE INVENTION

It is one object of the present invention to provide a universal trouble light of the character hereinafter described which permits rotation of the bulb housing with respect to the base housing and orientation of the illumination emitted substantially while at the same time providing means in connection ball joints in each member to prevent rotation of either member in one direction to an extent which will result in undue twisting of a conductor carried between them.

It is a further object of the present invention to so arrange the ball joints with the connector therebetween wherein the ball joint in the bulb housing will be freely rotatable in a one plane but not capable of rotation out of the plane while the ball joint in the base housing will be freely rotatable in a plane normal to the plane in which the first-mentioned ball is rotated without being rotatable out of that plane.

Thus, while the ball joints are used in order to provide appropriate bearing and appropriate mechanical support, the essential element and object of the present invention is the provision of the two rotatable members, one in the base housing and one in the bulb housing interconnected by a conduit which is rigidly connected between them through which an electrical conductor may pass where one ball joint is rotatable in one plane with respect to its housing, and the other ball joint is rotatable in the plane normal to that of the first ball joint with respect to its respective housing. The combination of the two planes of rotation of the integrated unit formed by the two ball joints and the conductor between results in the capacity for substantially universal rotation to the extent required of the bulb housing with respect to the base housing.

It is another object of this invention to provide a universal trouble light of the character described which provides for operative connection between the ball and socket members without the need for springs.

It is still another object of the invention to provide a universal trouble light in which the electrical terminals for the conductor between the bulb housing and base are so mounted as to minimize the risk of electrical conductor lead damage due to rotative and/or angular movement of the receptacle housing.

Essentially the present invention utilizes a base member which is provided with appropriate means for connecting the same to a source of current including additional means for controlling the current and a bulb housing for mounting a lamp. The base and the bulb housing are interconnected by an integrated structure which constitutes two rotatable members and a tubular member carried therebetween and fixed with respect to the two rotatable members. A conductor may be passed through the two rotatable members and the tubular member from the base member to the bulb housing.

One of the rotatable members is mounted at the top of the base section for rotation in one plane with respect to the base section. The other rotatable is mounted at the bottom of the bulb housing for rotation in a plane which (with respect at least to the structure constituting the two rotatable members and the tube) is normal to the plane of rotation of the first ball. This has the result that in addition to controlling all of the flexing forces which might be impinged on the electrical conductor carried therethrough, the incidence of twisting force on the conductor by rotating one end thereof to twist conductor along its longitudinal axis is eliminated. The bulb housing may be rotated and also placed at an appropriate angle with respect to the base section, but may not be rotated with respect thereto for any angular rotation which is sufficient to twist and possibly break the conductor or impose stresses thereon which the insulation between the elements of the conductor may not be designed to take.

BRIEF DESCRIPTION OF THE DRAWINGS

The foregoing and many other objects of the present invention may be more fully understood from the following description taken in connection with the drawings in which:

FIG. 2 is a side view of the trouble light of FIG. 1 with elements partially broken away or in section in order to show the details.

FIG. 3 is a detailed view showing the method of connecting a secondary collar on the ball carrying ends of the bulb housing and the base member.

FIG. 4 is a view partly in cross section showing in detail the means for anchoring the cage on the bulb housing to the base thereof and to the reflector for the bulb.

FIG. 5 is an enlarged view of a detail of the hinge section for the cage adjacent the upper or hook end of the structure.

FIG. 6 is a view in perspective showing the trouble light in use, resting on its base.

DESCRIPTION OF THE PREFERRED EMBODIMENT OF THE INVENTION

Figure 1:
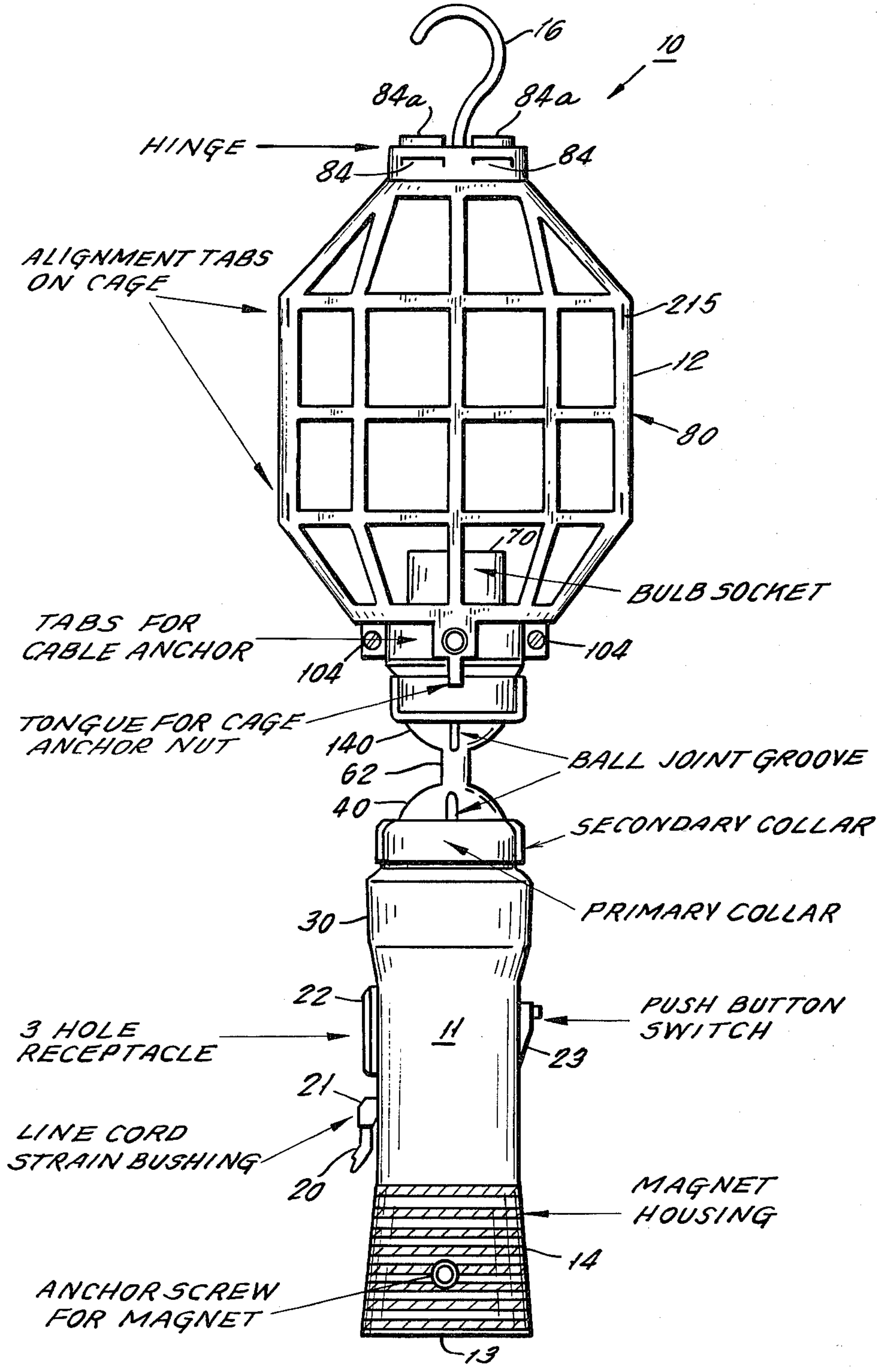
FIG. 1 is an elevation of the trouble light with the handle and barrel member in vertically aligned relation.

Referring now particularly to FIGS. 1 and 2 of the drawings, the trouble light 10 comprises a base member 11 and a bulb housing 12. The base member 11 is arranged so that it may stand on the bottom end 13 thereof. As will be noted the base member 11 is essentially a cylindrical member the base of which is sufficiently flat to stand on a surface. Preferably, the base member 13 is provided with a permanent magnet structure which may comprise a separate housing 14 which may be slid over the bottom end of the cylindrical base member 11 and secured thereto by an anchor screw 14. The housing 14 contains permanent magnets so arranged that they will provide an appropriate magnetic field for causing the base 13 of the housing 11 to be secured to a magnetizable material on any surface on which it may be placed. However the base member is sufficiently wide and steady so that if placed on a flat surface it will afford appropriate support for the structure.

The bulb housing (actually the cage 80 hereafter described) is provided at its upper end with the hook 16 which may serve as a hanger for the entire unit. This is particularly useful where it is desired to elevate the trouble light with respect to the work to be done or where there is neither a smooth surface for placing the trouble light or no surface of magnetizable material to which the base 13 and the magnet carrier secured thereto may be attached.

As seen in FIG. 1 a line cord 20 is extended through a strain bushing 21 to the interior of the barrel-like or cylindrical base housing 11. The base housing 11 may carry other accessories as for instance a receptacle 22 which can be connected in parallel with the trouble light itself to the line cord and the receptacle may be a three hole receptacle if the circuitry including the line cord permits or requires it. In addition, the base member 11 which also serves as a handle is provided with an on-off switch 23 which may be a push button switch but may also be any other suitable switch such as a slide switch, but in any event should be a switch that may be operated and left in an "on" position and then turned "off" when it is required that the circuit be turned off.

The upper end of the housing 11 at section 30 thereof is provided with (see also FIG. 2) an internal thread 31. The split collar 32 which is externally threaded at 33 may be screwed in to engage the internal thread 31 of the barrel housing 11. The collar 32 is split along a pair of diametrically opposite seams 34 one of which appears in the drawing so that it may be separated in order to permit the ball structure 40 to be placed therein prior to the insertion of the split collar 32 into the threaded section 31 at the end 30 of the housing. The split collar 32 is provided with the spherical recess 42 at the upper end thereof in order to receive the ball 40 and retain the same in position. When the split collar with the ball 40 in position is threaded into the end 30 of the housing, it should remain in position therein, particularly when the thread used as a tapered thread so that considerable force would be required for removal; but in addition, a lock screw 45 may be provided shown schematically at the right side of FIG. 2 in order to secure the collar in position against unexpected rotation out of the handle 11. In order to finish the structure at the top of the barrel 11 a secondary collar 50 may be provided having an end wall 51 with an opening therein through which the ball 40 may extend and a cylindrical side wall 52 with (as shown in FIG. 3) a secondary collar pin 54 extending therefrom to enter in the bayonnet slot 55 of the primary collar 50 in order to secure the secondary collar thereon. The secondary collar 50 ensures full containment of ball 40.

It will thus be seen that the ball 40 may rotate in the spherical recess 42 of the collar 32. It would normally be capable of rotating universally, as described in the above-mentioned application and patent, but for the modification which has been introduced to limit its rotation to rotation in a single plane as hereinafter described. The ball 40 is hollow so that the conductor 120 internally of the handle or base member 11 may extend from the on-off switch 23 through the inside 60 of the ball 40 and then through the conduit 62 which preferably is integral or integrated with the ball 40 and constitutes a tubular member which connects the ball 40 to the ball 140 at the lower end of the housing 111 for the bulb.

The connection of the ball 140 to the housing 111 is identical with the connection hereinafter described for the connection of the ball 40 to the housing 111. That is the split collar 132 having the spherical recess 142 for receiving the ball 140 is split on diametrically opposite sides along the seams 134 to permit the collar to be put together around the ball 140 and then the threaded end 133 of the collar may now be screwed into the threaded interior 131 of the section 130 of the housing 111 and locked into position against unintended removal by the lock screw 145.

The secondary collar 150 having the side wall 152 and the finishing or end wall 151 may then be bayonet-locked at the end of the primary collar 150 by means of the bayonet joint already described in connection with FIG. 3. The line cord 120 can now extend through the interior 60 of the ball 140 and the interior of the conduit 62 and through the interior 160 of the ball 140 to the bulb socket 70 secured to the lower end of the interior of housing 111 in any suitable manner.

The socket 70 has secured thereto on one side thereof the vertical reflector 72 which is extended outwardly as indicated at **72*a* of FIG. 4 and 72*b* of FIG. 5 in order to accommodate a bulb which may be screwed into the socket 70. The reflector is arranged at its top so that the case 80 may be hingedly connected thereto by a hinge member 81. The reflector section 72*b* merges into the top section 72*c* and the vertical central member 72*d*. The vertically extending member 72*d* of the reflector 72 is provided with the opening 83 into which the reentrantly curved extension 84 of the top of the cage 80 extends in order to form a hinged structure wherein the reentrant section 84*a* controls the positioning of the cage 80 for the closure. The cage 80 is extended upwardly to form hook 16. At the bottom the cage 80 terminates in an annular section 90. The reflector section 72 terminates in the annular member 100 and the cage section rotates at its bottom end 90 in the annular member 101**.

Annular member or collar 100 is provided with flanges 102 on each side. The annular member or collar 101 is provided flange 103 which in turn secures the portion of the cage. The screws 104 on each side interconnect the flanges 102, 103 on each side. The collar 101 to which the cage is releasably fastened is provided with a clamp member 105. The cage section 80 at its lower end 90 is provided with a downwardly depending tab 106 having an opening 107 which registers with the opening 108 in the collar 101. A clamping screw 200 and a clamping nut 201 serve to secure the flanges 105 and 106 together. The nut 201 is prevented from being lost by a plastic tab 202 which is connected from a groove 203 in the nut to the half clamp member 105.

It will thus be seen that the cage may be unlocked by opening the nut 201 removing it from the screw 200 and lifting the cage up around the hinge section 81. The bulb may then be replaced in the socket 70 and then the cage 80 may be swung down around the hinge 84; the screw 200 and the nut 201 may then be interconnected to integrate the cage with the reflector and complete the bulb mounting arrangement. Alignment tubs 215 on the cage 80 may combine with appropriate recesses on the reflector to assist in integrating the units.

The essential contribution of the present invention is the structure of the balls 140. Should the balls be permitted to rotate freely that would produce a universal mounting for the cage section with respect to the base section. However, such free rotation of the balls would have the result that the conductor which is passed through the inside of ball 60 and then the inside of conduit 62 and the inside of ball 160 could be twisted irretrievably.

In the present structure, the balls are arranged so that they can rotate in only a single plane. Universal rotation to permit changes in azimuth of the light can be obtained simply by rotating the entire handle structure thereby rotating the light. The rotation of each of the balls in a single plane with respect to their respective mounts and limitation of rotation of the balls prevents the conductor 120 from being irretrievably twisted and broken.

In order to achieve this result, the collar 42 is provided with the pin 210 which enters into the annular groove 211 of the ball 40 on the outer surface thereof, and the collar 142 is similarly provided with the pin 210*a* which enters into the annular groove 211*a* of the outer surface of ball 160. This limits the rotation of the two balls with respect to their respective mounts so that they may each rotate in a single plane.

With the bulb housing 12 and basing housing 11 vertically axially aligned, the plane of rotation of each ball is a vertical plane with, preferably, the two planes at right angles to each other. By this means therefore, the two balls are permitted to rotate readily but in a single plane each with respect to their respective mounts so that a twisting of the internal wire 120 cannot occur. In this case, the orientation of the bulb housing structure 111 with respect to the base housing 11 can be achieved by rotation of the housings with respect to either of the balls. Where the upper housing is rotated with respect to its ball and the tube 62 remains coaxial with the lower housing, then the upper housing will extend a shorter distance from the lower housing in a radial direction than if the rotation occurs of only the ball of the lower housing. The fact is, however, that with the two types of rotation and the annular recesses 211 and 211*a* on the outside of the respective balls 42 and 142 the rotation may be achieved in full from axial alignment to at least 90°. The azimuth adjustment of the light may then be achieved by rotating the entire handle structure around its axis.

The fact that the clamp members or support members 100 and 101 are rotatable with respect to the housing 111 makes the adjustment of the reflector a simple matter. The utilization of the magnetic end at the bottom of the housing permits the lower housing to be positioned on any surface of magnetizable material in order to position the trouble light. The fact that it is flat will permit it to stand on any flat surface whether or not it is of magnetizable material and the hook member may be used to hang the trouble light appropriately whenever that is necessary. By this means therefore, a simplified trouble light structure is obtained having an appropriate handle and a bulb housing connected to the handle with the bulb housing readily rotatable as a unit with respect to the handle to different angular positions with respect to the handle member. The rotation, however, is so arranged that rotation and azimuth is obtained by rotating the entire unit by, for instance, changing the position of the handle radially. In this way any possible twisting or damage to the internal conductor 120 is obviated.

In the foregoing the present invention has been described solely in connection with preferred illustrative embodiments thereof. Since many variations and modifications of the present invention will now be obvious to those skilled in the art, it is preferred that the scope of the present invention be determined not by the specific disclosures herein contained but only by the appended claims.

I claim:

1. A universal trouble light comprising:

a handle section and a bulb carrying section;

said handle extending longitudinally;

a first ball element having a through aperture formed therein and a socket for said ball element adapted to rotatably retain same and be carried by said handle at one end thereof;

said bulb carrying section extending longitudinally;

a second ball element having a through aperture formed therein and a socket in said bulb carrying section for said second ball element adapted to rotatably retain same at one end thereof;

a hollow sleeve member rigidly connecting said first and second ball elements to thereby position said one end of said handle and bulb carrying sections in spaced proximity to each other permitting relative angular movement therebetween;

a bulb receiving socket positioned within said bulb carrying section;

an electrical conductor element extending through the apertures in said ball elements and through said sleeve connecting said bulb socket with a member in said handle section; and means restricting rotation of each ball element to rotation in a single plane.

2. The universal trouble light of claim 1, wherein said rotation of each ball section is over a limited arc less than the circumference of said ball.

3. A trouble light according to claim 2, wherein said handle and bulb carrying sections are hollow and the respective said one ends thereof are internally threaded, the said sockets associated respectively with said first and second ball elements each comprising a circularly extending collar having an axial split therein, each said collar having a spherically-configured interior portion complementary with the exterior surface of the associated ball element for rotatably retaining same and each of said collars having an external tapered threaded portion cooperable with corresponding threads of the handle and bulb carrying section for adjustably regulating the degree of retaining force exerted by the collars on said ball elements.

4. A trouble light according to claim 3, including a first coupling element mounted on said receptacle and a second coupling element mounted within said handle, said electrical conductors being connected at one end thereof to said first coupling element and secured at the other end thereof by said second coupling element.

5. A trouble light according to claim 4, including switch means mounted within said handle and actuable externally thereof, said other end of said electrical conductor elements being connected to said switch means.

6. A trouble light according to claim 1, including at least one permanent magnet carried by said handle.

7. A trouble light according to claim 1, wherein said barrel member includes a cage-like housing and light-reflective section.

8. A trouble light according to claim 1, including a hook element carried by said bulb carrying section.

9. A universal trouble light according to claim 1, wherein each of the ball elements is provided with a recessed keyway in its outer surface and the interior of each socket carries a pin extending into said keyway; said keyway lying in a plane extending through the axis of the handle in the case of the ball carried thereby, and the axis of the bulb carrying section in the case of the ball carried thereby.

10. The universal trouble light of claim 9, said planes through the axes of the respective handle and bulb carrying sections being normal to each other when the axes of said handle and bulb carrying sections are aligned.

* * * * *